United States Patent
Ying et al.

(10) Patent No.: US 7,327,393 B2
(45) Date of Patent: Feb. 5, 2008

(54) CMOS IMAGE SENSOR WITH VARIABLE CONVERSION GAIN

(75) Inventors: Bond Y. Ying, Corvallis, OR (US); Richard L Baer, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 783 days.

(21) Appl. No.: 10/283,970

(22) Filed: Oct. 29, 2002

(65) Prior Publication Data
US 2004/0079977 A1    Apr. 29, 2004

(51) Int. Cl.
*H04N 5/335* (2006.01)
(52) U.S. Cl. ............................. 348/308; 348/307
(58) Field of Classification Search ........... 348/308, 348/310, 307
See application file for complete search history.

(56) References Cited

U.S. PATENT DOCUMENTS

RE34,926 E * 5/1995 Hieda et al. ............ 348/223.1
6,246,436 B1 * 6/2001 Lin et al. ................ 348/308
2004/0012697 A1 * 1/2004 Rossi ...................... 348/308

* cited by examiner

*Primary Examiner*—Lin Ye
*Assistant Examiner*—Nicholas G Giles
(74) *Attorney, Agent, or Firm*—RatnerPrestia

(57) ABSTRACT

An image sensor pixel has variable conversion gain to prevent overexposure of the pixel without reducing the exposure period. Under dim lighting conditions, the pixel operates with high conversion gain and is highly sensitive to light. When the incident light is bright, the pixel switches into a low conversion gain, low-sensitivity mode. The variable conversion gain is implemented by connecting a variable capacitive load in parallel with the photodiode of the image sensor pixel. When the incident light intensity exceeds a certain threshold, the variable capacitive load is increased to allow the photodiode to absorb more light. Likewise, the variable capacitive load is decreased when the incident light intensity is below a certain threshold.

14 Claims, 4 Drawing Sheets

CMOS IMAGE SENSOR WITH VARIABLE CONVERSION GAIN

FIELD OF THE INVENTION

The invention is directed towards the field of CMOS image sensors, and more specifically, towards preventing overexposure in CMOS image sensors.

BACKGROUND OF THE INVENTION

CMOS image sensors are gaining widespread use as digital cameras and digital video cameras become more common. Similar to traditional film, the CMOS image sensor captures an image when exposed to light. The CMOS image sensor typically consists of a large array of pixels that are organized into rows. Normally, the pixels in the array are not all exposed to light at the same time. Rather, the pixels are exposed sequentially, row by row. This method is known as a "rolling shutter". The exposure time for a single row of pixels is called the exposure period. The total time required to expose and process the pixels in the entire array is known as the frame period.

One problem associated with the rolling shutter method is that the illumination level of the light source may vary over time. This variation is called "flicker". Light sources exhibiting flicker have peaks in brightness corresponding to each peak of the power line frequency. The resulting light pulses have a flicker period that is half that of the AC power line. When the period of the flicker is longer than the exposure period and shorter than the frame period, the final image has bands of contrasting brightness.

The effects of flicker can be avoided by restricting the exposure period of each pixel row to be an integral multiple of the flicker period. However, the exposure period cannot be reduced below the flicker period. If the illumination is very bright, and the exposure period cannot be reduced, then the image will be overexposed. Overexposure can occur when the scene is illuminated with bright lights, or when a camera is pointed directly at a light source.

FIG. 1 shows a basic three-transistor pixel 101 used in prior art image sensor arrays. A transistor M1 connects the cathode (node 103) of a photodiode 125 to a voltage supply, Vdd 107. The anode of the photodiode 125 is connected to ground. The gate of transistor M1 is connected to a reset signal 109. Transistor M3 connects Vdd 107 to another transistor M5. The gate of transistor M3 is connected to node 103. The gate of transistor M5 is controlled by a row select signal 111, while its source is connected to a column output line 113, from which the output of the pixel 101 is read. Transistor M3 is used as a source follower to buffer the photodiode 125 and prevent it from being loaded down by the column output line 113.

In normal operation, the photodiode 125 is reset to the supply voltage Vdd 107 at the beginning of an exposure period, by asserting the reset signal 109 and charging node 103. As the photodiode 125 is exposed to incident light, it accumulates more charge and the voltage at node 103 decreases. The voltage across the photodiode 125 is indicative of the light intensity that the photodiode 125 has been exposed to over time. At the end of the exposure period, the row select signal 111 is asserted to read out the values of a row of pixels in the image sensor array.

In normal operation, the photodiode 105 is reset to the supply voltage Vdd 107 at the beginning of an exposure period, by asserting the reset signal 109 and charging node 103. As the photodiode 105 is exposed to incident light, it accumulates more charge and the voltage at node 103 decreases. The voltage across the photodiode 105 is indicative of the light intensity that the photodiode 105 has been exposed to over time. At the end of the exposure period, the row select signal 111 is asserted to read out the values of a row of pixels in the image sensor array.

The conversion gain of the pixel 101 is defined as the ratio of the change in voltage to the change in charge of the photodiode 125. The capacitance of the photodiode 125 is determined by calculating the amount of charge stored for a given amount of voltage applied. Therefore, the conversion gain of the three-transistor pixel 101 is inversely proportional to the capacitance at node 103.

Pixel circuits are generally designed to have high conversion gain, to improve the pixel sensitivity under low-light conditions. However, if the lighting conditions are too bright, the photodiode will accumulate too much charge and reach saturation, at which point the voltage at node 103 falls to zero. Further exposure of the photodiode cannot be registered, because the voltage cannot fall below zero. As a result, the output signal of the pixel will be clipped, and the final image will look overexposed.

One solution to the problem of clipping is to reduce the exposure period. However, as previously discussed, reducing the exposure period is problematic in lighting environments with flicker. Therefore, a need remains for a solution for preventing overexposure in an image sensor without reducing the exposure period.

SUMMARY OF THE INVENTION

In accordance with an illustrated preferred embodiment of the present invention, a variable conversion gain pixel prevents overexposure without reducing the exposure period. Under dim lighting conditions, the pixel operates with high conversion gain and is highly sensitive to light. When the incident light is bright, the pixel switches into a low conversion gain, low-sensitivity mode.

The variable conversion gain is implemented by connecting a variable capacitive load in parallel with the photodiode of the image sensor pixel. When the incident light intensity exceeds a certain threshold, the variable capacitive load is increased to allow the photodiode to absorb more light. Correspondingly, the variable capacitive load is decreased when the incident light intensity is below a certain threshold.

Further features and advantages of the present invention, as well as the structure and operation of preferred embodiments of the present invention, are described in detail below with reference to the accompanying exemplary drawings. In the drawings, like reference numbers indicate identical or functionally similar elements.

DETAILED DESCRIPTION

Figure 2A:
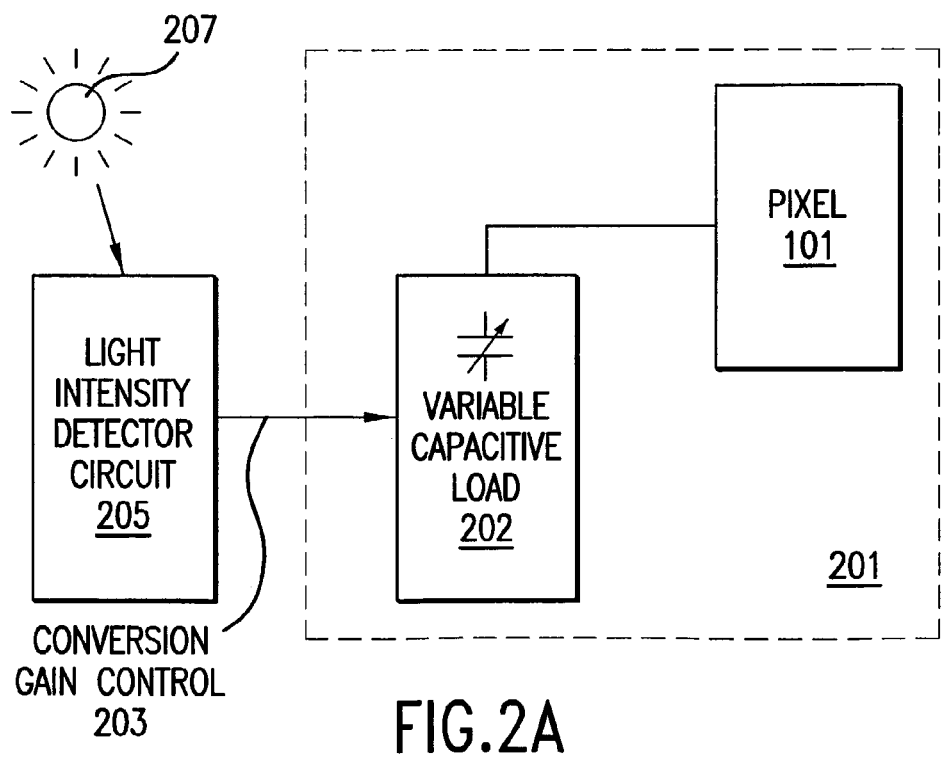
FIG. 2A shows a block diagram of a variable conversion gain pixel with a light intensity detector.

FIG. 2A shows a block diagram of a variable conversion gain pixel 201, in a preferred embodiment of the present invention. A pixel, such as the prior art pixel 101, is connected to a variable capacitive load 202. A light intensity detector circuit 205 (located outside the variable conversion gain pixel 201) senses the brightness of incident light 207, and outputs a conversion gain control signal 203 in response. The conversion gain control signal 203 adjusts the capacitance of the variable capacitive load 202 to compensate for the intensity of the incident light 207.

Figure 1:
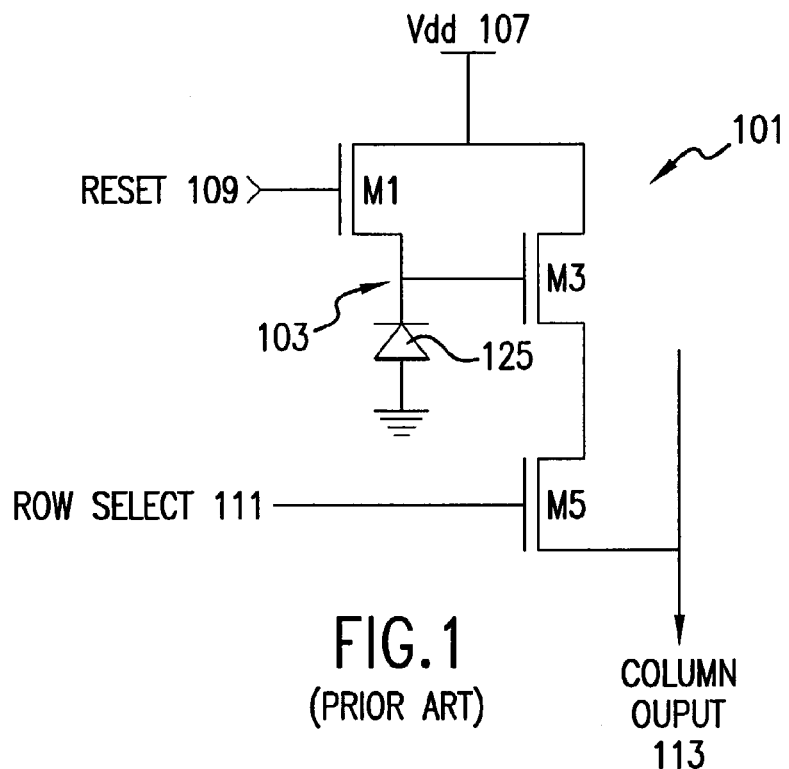
FIG. 1 shows a basic three-transistor pixel used in prior art image sensor arrays.
Figure 2B:
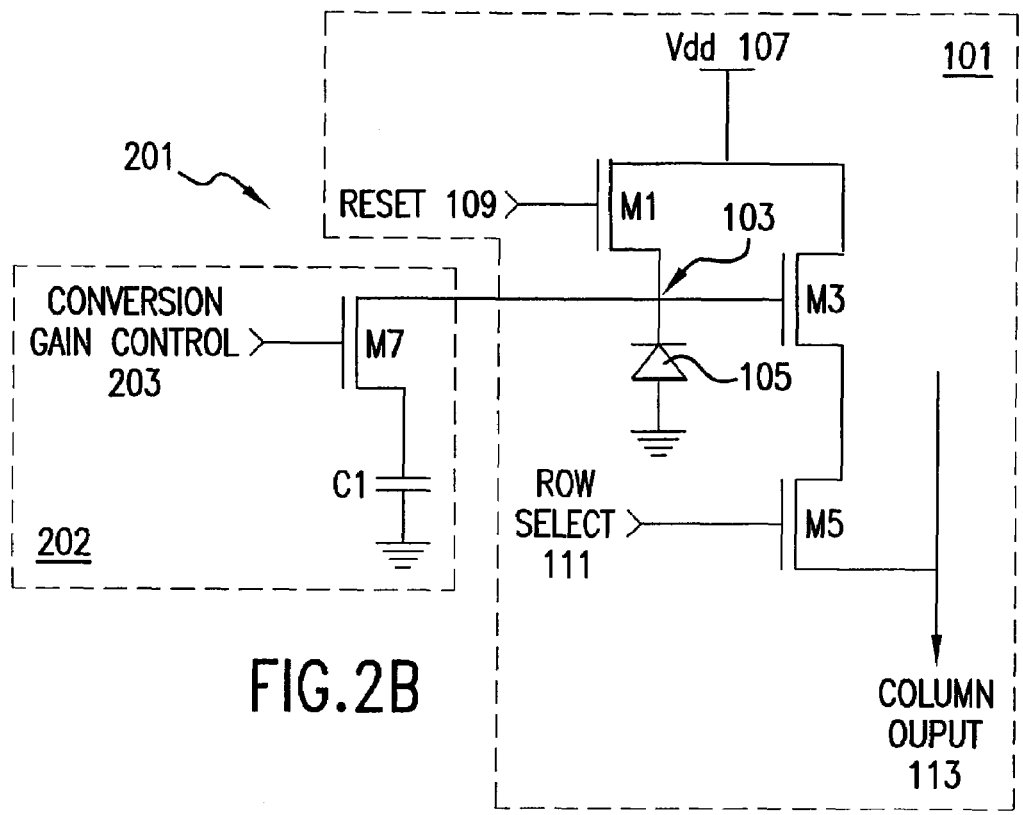
FIG. 2B shows the variable conversion gain pixel of FIG. 2A in more detail.

FIG. 2B shows the variable conversion gain pixel 201 of FIG. 2A in more detail. The pixel 101 is the same pixel shown in FIG. 1. The variable capacitive load 202 consists of a transistor M7 and a capacitor C1, and is connected in parallel with the photodiode 105. The transistor M7 connects the capacitor C1 to node 103 of the pixel 101. The gate of the transistor M7 is connected to the conversion gain control signal 203 from the light intensity detector circuit 205 (not shown).

When the light intensity detector circuit 205 determines that the brightness of the incident light 207 has exceeded a certain threshold, it asserts the conversion gain control signal 203. Transistor M7 is activated, thus adding capacitor C1 to the capacitance of the photodiode 105. Now, the variable conversion gain pixel 201 can tolerate an increased light exposure level before clipping occurs. When the light level drops back below the threshold, the light intensity detector circuit 205 deactivates transistor M7 to return the variable conversion gain pixel 201 to its normal exposure sensitivity.

The size of capacitor C1 will vary depending on the anticipated lighting conditions and applications for the variable conversion gain pixel 201. A capacitance 4-10 times the original capacitance at node 103 should be sufficient to prevent overexposure in most situations. Although a capacitor is shown in FIG. 2B to implement the capacitive load, any device with capacitive properties—such as a transistor—will also work.

Figure 3:
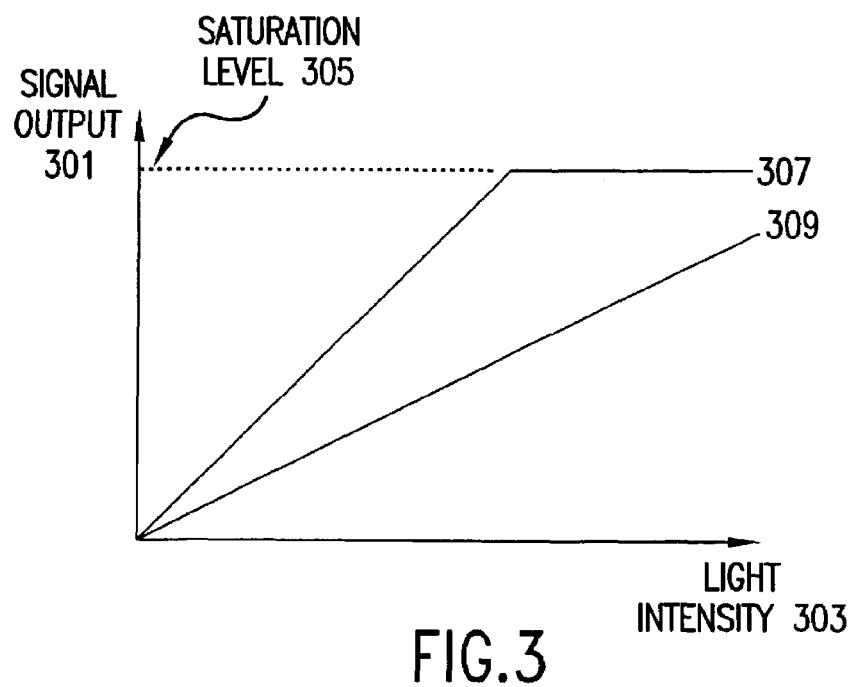
FIG. 3 shows two different conversion gain transfer curves for the variable gain pixel of FIG. 2B.

FIG. 3 shows two different conversion gain transfer curves for the variable conversion gain pixel 201 of FIG. 2B. Essentially, the conversion gain control signal 203 is selecting between these two conversion gain transfer curves when switching transistor M7 on or off. The graph plots the signal output 301 of variable conversion gain pixel 201 against the light intensity 303 of the incident light 207 during the exposure period. The saturation level of the photodiode 105 is indicated by dotted line 305. Line 307 is the transfer curve before capacitor C1 is added in parallel to the photodiode 105. This selection has a higher conversion gain and higher sensitivity, but clips at a lower light intensity level. Line 309 is the transfer curve after capacitor C1 is added. It provides lower sensitivity, but does not clip as early as line 307.

Figure 4:
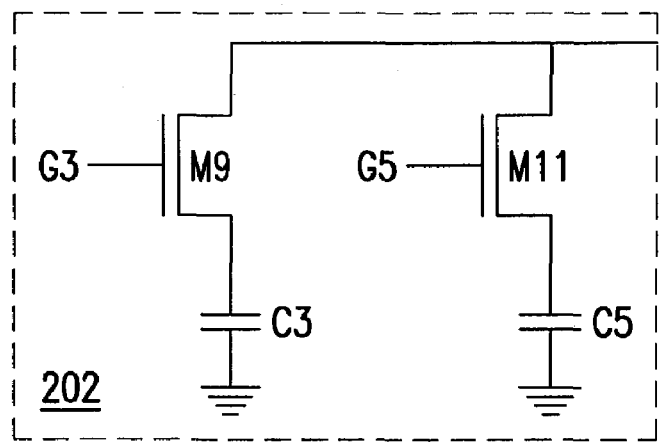
FIG. 4 shows another possible configuration for a variable capacitive load, having several discrete levels of capacitance.

FIG. 4 shows another possible configuration for the variable capacitive load 202, having several discrete levels of capacitance. The variable capacitive load 202 has two parallel legs, each leg consisting of a transistor in series with a capacitor. Transistor M9 is in series with capacitor C3. The gate of transistor M9 is controlled by conversion gain control signal G3. Transistor M11 is in series with capacitor C5. The gate of transistor M11 is controlled by conversion gain control signal G5.

If capacitor C3 is the same size as capacitor C5, the variable capacitive load 202 can be increased by two discrete levels: capacitance C3 and capacitance C3+C5. If capacitor C3 is a different size from capacitor C5, the variable capacitive load 202 can be increased by three discrete levels: capacitance C3, capacitance C5, and capacitance C3+C5. This allows the conversion gain for the pixel to be changed in response to several different thresholds of light intensity. It is possible to have more than two legs in the variable capacitive load 202.

Figure 5:
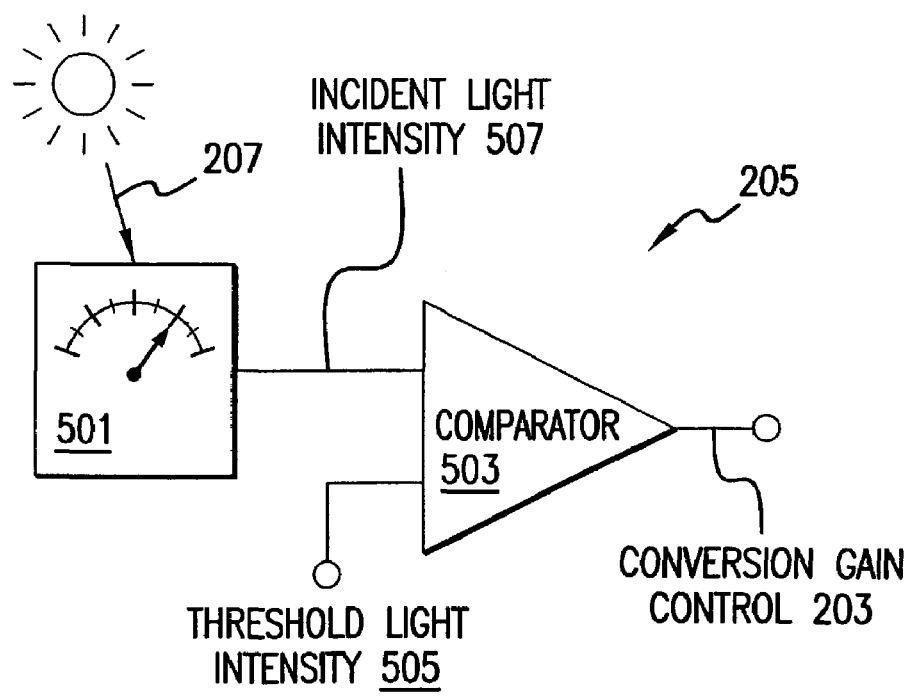
FIG. 5 illustrates a symbolic implementation of the light intensity detector circuit.

FIG. 5 illustrates a symbolic implementation of the light intensity detector circuit 205. A light-measuring mechanism 501 measures the intensity of the incident light 207 and outputs the measurement as incident light intensity 507. The light-measuring mechanism 501 can be implemented in many ways. One method is to use a separate light sensor, such as a photodiode. Alternatively, the image sensor array itself can be used to take a test image first to check light levels, before acquiring the actual image. A comparator 503 is then used to compare the incident light intensity 507 against a threshold light intensity 505. If the incident light intensity 507 exceeds the threshold light intensity 505, then the conversion gain control signal 203 is asserted to increase the capacitive load on the photodiode 105. Correspondingly, the conversion gain control signal 203 is de-asserted to decrease the capacitive load on the photodiode 105 when the incident light intensity 507 is below the threshold light intensity.

In FIG. 2B, transistor M7 contributes to the capacitance and leakage of the photodiode 105 during both high and low sensitivity modes of operation. This configuration may degrade the performance of the pixel under low light conditions. It would be preferable to isolate the loading effect of the extra transistor from the photodiode 105 while it is in its high sensitivity mode.

Figure 6:
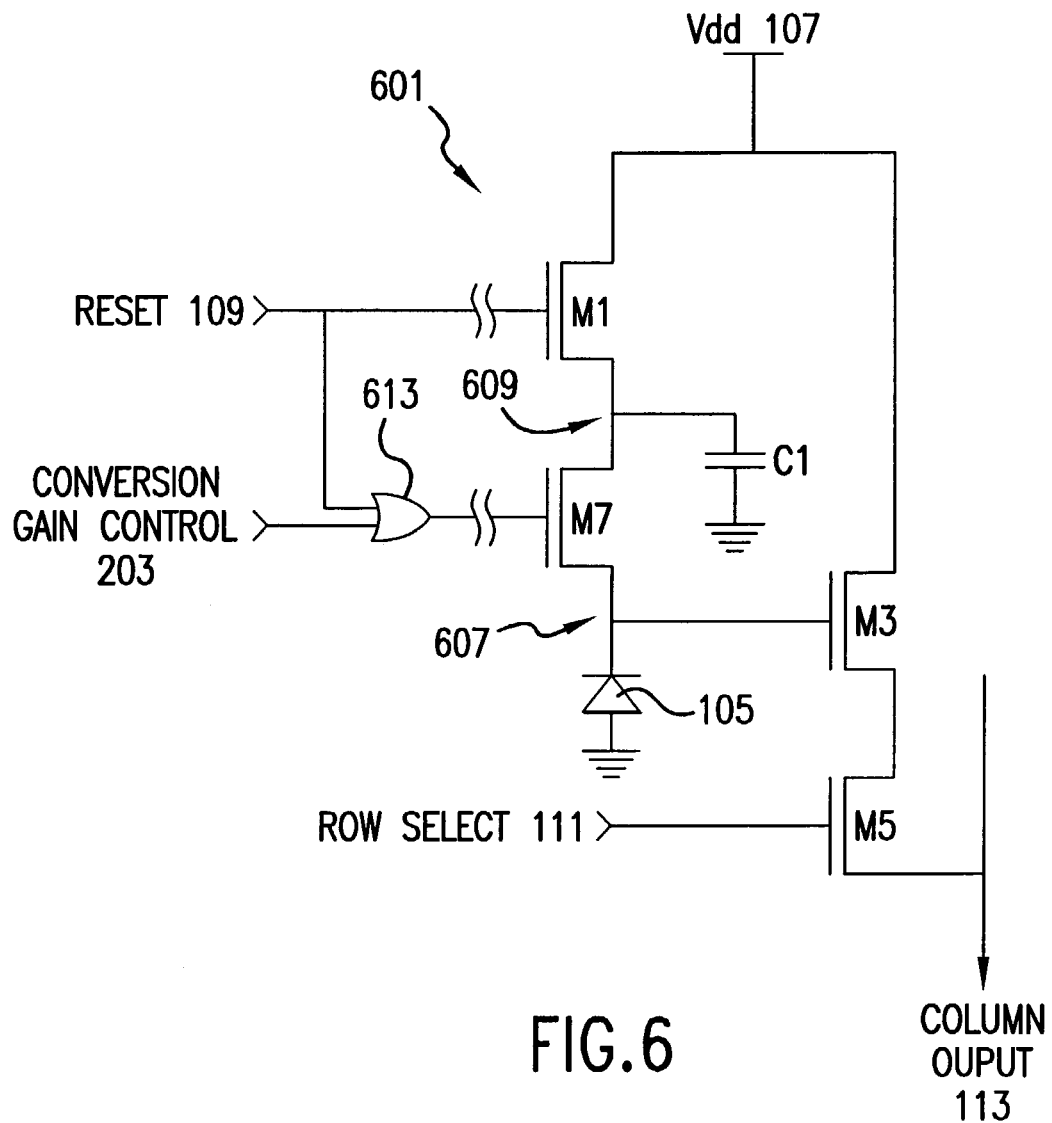
FIG. 6 shows an alternate embodiment for the variable conversion gain pixel.

FIG. 6 shows an alternate embodiment variable conversion gain pixel 601. A voltage supply Vdd 107, transistor M1, and transistor M7 are respectively connected in series to the cathode of photodiode 105 at node 607. A capacitor C1 is connected to node 609, at the juncture of transistors M1 and M7. Transistor M1 is controlled by a reset signal 109. Transistor M7 is controlled by the output of an OR gate 613. The inputs to the OR gate 613 are the reset signal 109 and a conversion gain control signal 203. Transistor M3 connects Vdd 107 to another transistor M5. The gate of transistor M3 is connected to the node 607. The gate of transistor M5 is controlled by a row select signal 111, while its source is connected to a column output line 113. The OR gate 613 that is depicted in the figure is not located inside of the pixel 601. Rather, a single OR gate 513 is provided for each row of pixels.

The gates of transistors M1 and M7 both receive the same reset signal 109 to reset the pixel 601 at the start of an exposure period. While the conversion gain control signal 203 remains unasserted, the pixel 601 operates in its high sensitivity (high conversion gain) mode. Since transistor M7 is now connected serially with the reset transistor M1, there is no additional load on the photodiode 105 at node 607. When the conversion gain control signal 203 is asserted, transistor M7 switches on and adds the load capacitor C7 to the capacitance at node 607. This switches the pixel 601 into its low sensitivity (low conversion gain) mode.

Although the present invention has been described in detail with reference to particular preferred embodiments, persons possessing ordinary skill in the art to which this invention pertains will appreciate that various modifications and enhancements may be made without departing from the spirit and scope of the claims that follow.

We claim:

1. A variable conversion gain pixel, comprising:
   an image sensor pixel having a photodiode and a reset transistor for receiving a reset signal to reset the photodiode,
   a light intensity detector circuit that detects an intensity of incident light and generates a control signal having a level that is based on the detected intensity of incident light, the light intensity detector circuit configured to detect the intensity of incident light separately from incident light detected by the photodiode; and
   a variable capacitive load in parallel with the photodiode, the variable capacitive load receiving the control signal and varying the variable capacitive load according to the lever of the received control signal;
   wherein the variable capacitive load includes
   an OR-gate that receives the control signal and the reset signal,
   a control transistor connected to the OR-gate far receiving the control signal or the reset signal;
   a capacitor directly connected to both the control transistor and the reset transistor,
   wherein the control transistor connects the capacitor in parallel to the photodiode (a) when the control signal generated by the light intensity detector circuit (b) is active, or (b) when the reset signal is active,
   the control transistor disconnects the capacitor from the photodiode (a) when the control signal generated by the light intensity detector circuit is inactive, and (b) when the reset signal is inactive.

2. A variable conversion gain pixel as in claim 1, wherein the variable capacitive load includes
   a circuit having multiple parallel legs, each leg having a control transistor in series with a capacitor, each control transistor receiving the control signal
   wherein each control transistor activates to connect its capacitor in parallel to the photodiode when the received control signal has a first level, and
   each control transistor deactivates to disconnect its capacitor from the photodiode when the received control signal has a second level.

3. A variable conversion gain pixel as in claim 1, wherein the light intensity detector circuit includes a comparator that compares the incident light intensity to a threshold and generates the control signal such that the control signal has a level that is based on results of the comparison, the comparator outputting the generated control signal.

4. A variable conversion gain pixel as in claim 3, wherein the control transistor is controlled by the control signal output from the comparator.

5. A variable conversion gain pixel as in claim 1, wherein the light intensity detector circuit includes another light sensor that is separate from the image sensor pixel.

6. A variable conversion gain pixel as in claim 5, wherein the other light sensor is another photodiode.

7. A variable conversion gain pixel as in claim 1, further including a readout node connected to the photodiode, wherein the readout node provides an output value indicative of light exposure of the photodiode, and
   the variable capacitive load is connected in parallel with the photodiode at the readout node.

8. A variable conversion gain pixel as in claim 7, wherein the control signal is generated independently of the output value of the readout node.

9. A method for varying the conversion gain of an image sensor pixel having a photodiode and a reset transistor for receiving a reset signal to reset the photodiode, comprising:
   in a light intensity detector circuit, detecting the intensity of light that is incident upon the photodiode of the image sensor pixel;
   in the light intensity detector circuit, generating a control signal having a level that is based on the detected light intensity;
   providing the generated control signal and the reset signal to a variable capacitive load that is in parallel with the photodiode;
   varying the variable capacitive load according to the level of the control signal received by the variable capacitive load to thereby vary the capacitance across the photodiode; or
   varying the variable capacitive load across the photodiode during activation of the reset signal.

10. The method as in claim 9, wherein determining the incident light intensity includes:
    comparing the incident light intensity to a threshold, wherein if the incident light intensity exceeds the threshold, the generated control signal has a first level, and wherein if the incident light intensity is below the threshold, the generated control signal has a second level.

11. A method as in claim 10, wherein varying the variable capacitive load includes:
    connecting a capacitor in parallel with the photodiode when the control signal has the first level;
    disconnecting a capacitor in parallel with the photodiode when the control signal has the second level; and
    connecting a capacitor in parallel with the photodiode when the reset signal is active.

12. The method as in claim 9, wherein detecting the intensity of light includes
    detecting another intensity of light that is incident upon a light sensor that is separate from the image sensor pixel.

13. The method as in claim 12, wherein detecting the other intensity of light is performed during a period that is concurrent with an exposure period of the photodiode.

14. The method as in claim 9, wherein detecting the intensity of light includes
    detecting another intensity of light that is incident upon the photodiode as a test image during a period prior to detecting the intensity of light that is incident upon the photodiode as an actual image.

* * * * *

UNITED STATES PATENT AND TRADEMARK OFFICE
CERTIFICATE OF CORRECTION

| | | |
|---|---|---|
| PATENT NO. | : 7,327,393 B2 | Page 1 of 1 |
| APPLICATION NO. | : 10/283970 | |
| DATED | : February 5, 2008 | |
| INVENTOR(S) | : Ying et al. | |

It is certified that error appears in the above-identified patent and that said Letters Patent is hereby corrected as shown below:

In column 5, line 17, in Claim 1, delete "lever" and insert -- level --, therefor.

In column 5, line 21, in Claim 1, delete "far" and insert -- for --, therefor.

In column 5, line 27, in Claim 1, after "circuit" delete "(b)".

Signed and Sealed this

Twenty-seventh Day of May, 2008

JON W. DUDAS
*Director of the United States Patent and Trademark Office*